(12) United States Patent
Kim et al.

(10) Patent No.: US 11,479,112 B2
(45) Date of Patent: Oct. 25, 2022

(54) FUEL TANK VENTING SYSTEM FOR HYBRID VEHICLE

(71) Applicants: Hyundai Motor Company, Seoul (KR); Kia Motors Corporation, Seoul (KR)

(72) Inventors: Chang Han Kim, Gwangju (KR); Man Seok Oh, Yongin-si (KR); Seok Lae Kim, Seongnam-si (KR); Chang Jun Park, Changwon-si (KR); Jong Ki Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 267 days.

(21) Appl. No.: 16/942,430

(22) Filed: Jul. 29, 2020

(65) Prior Publication Data

US 2021/0138896 A1   May 13, 2021

(30) Foreign Application Priority Data

Nov. 12, 2019  (KR) .......................... 10-2019-0144339

(51) Int. Cl.
*B60K 15/035*  (2006.01)
*B60K 15/063*  (2006.01)
*B60K 1/04*  (2019.01)
*B60K 15/03*  (2006.01)

(52) U.S. Cl.
CPC .......... *B60K 15/03519* (2013.01); *B60K 1/04* (2013.01); *B60K 15/063* (2013.01); *B60K 2015/03236* (2013.01); *B60K 2015/03256* (2013.01); *B60K 2015/03514* (2013.01); *B60K 2015/03571* (2013.01); *B60K 2015/03585* (2013.01); *B60K 2015/0634* (2013.01)

(58) Field of Classification Search
CPC ................ B60K 1/04; B60K 15/03519; B60K 15/03504; F02M 25/089; F02M 25/0836
See application file for complete search history.

(56) References Cited

U.S. PATENT DOCUMENTS

| | | | | |
|---|---|---|---|---|
| 2010/0116570 A1* | 5/2010 | Sugawara | ............... | B60L 58/16 |
| | | | | 429/82 |
| 2012/0040253 A1* | 2/2012 | Hermann | ............ | H01M 10/445 |
| | | | | 429/403 |
| 2012/0312281 A1* | 12/2012 | Tsutsumi | ............. | F02M 25/089 |
| | | | | 123/519 |
| 2017/0050633 A1* | 2/2017 | Sato | ....................... | B60W 10/06 |
| 2018/0111499 A1* | 4/2018 | Wada | ..................... | B60K 11/04 |
| 2020/0247386 A1* | 8/2020 | Dudar | .................. | B60W 10/24 |

* cited by examiner

*Primary Examiner* — Reinaldo Sanchez-Medina
(74) *Attorney, Agent, or Firm* — Slater Matsil, LLP

(57) ABSTRACT

A fuel tank venting system for a hybrid vehicle includes a first flow path configured to deliver fuel vaporized from a fuel tank to a canister, a second flow path configured to deliver air used for cooling a high voltage battery to the canister, a first three-way valve disposed on the second flow path and configured to control opening and closing of a first discharge port for releasing pressure of the fuel tank, a second three-way valve disposed on the second flow path and configured to control opening and closing of a second discharge port for flowing the air used for cooling the high voltage battery into the canister or discharging the air used for cooling the high voltage battery outside the vehicle, and a controller configured to control the first three-way valve and the second three-way valve.

20 Claims, 5 Drawing Sheets

[FIG. 1]
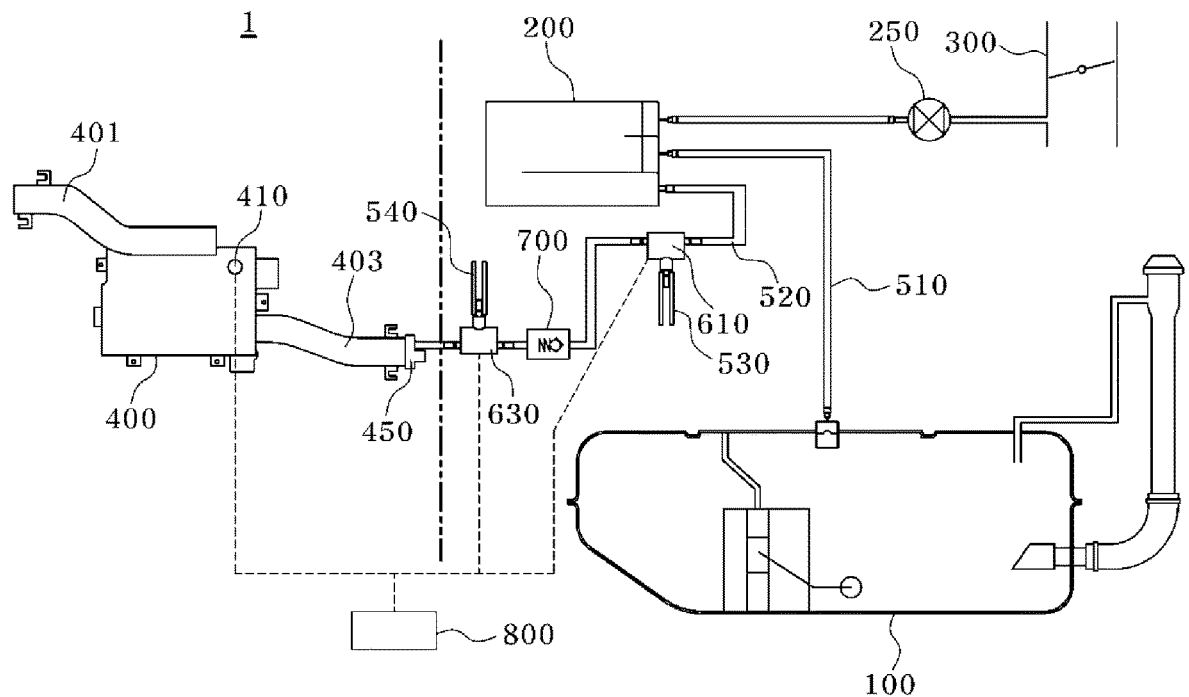
[FIG. 2]
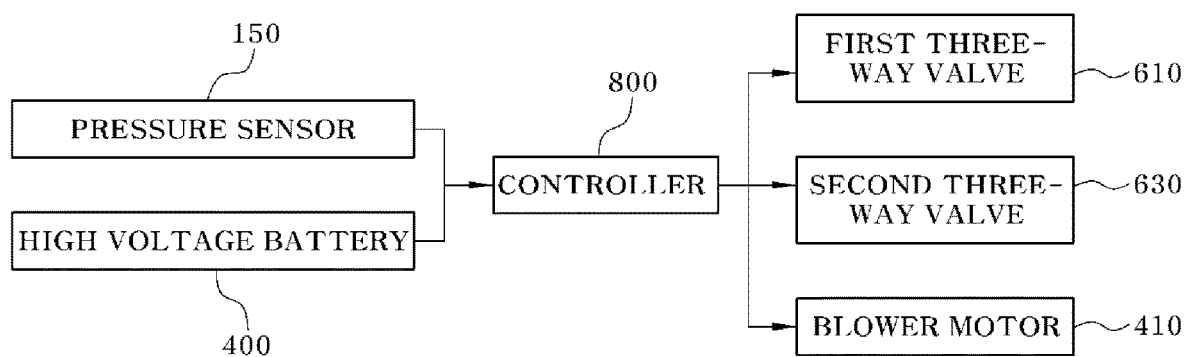

[FIG. 3]
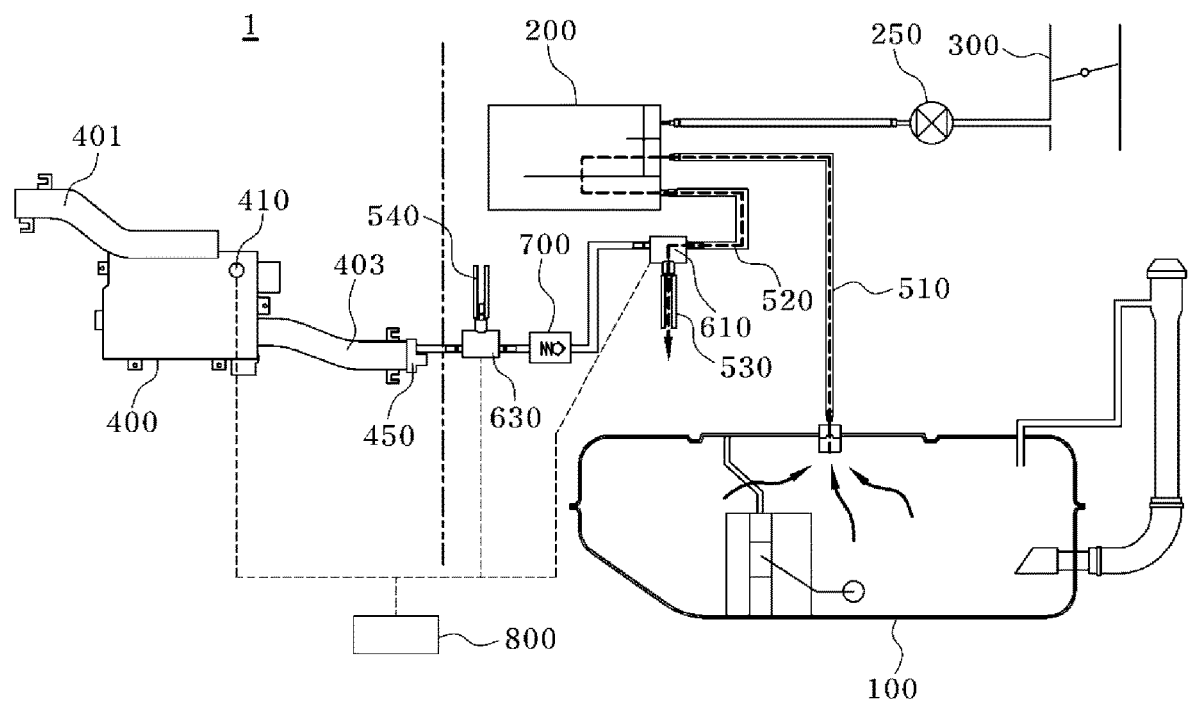
[FIG. 4]
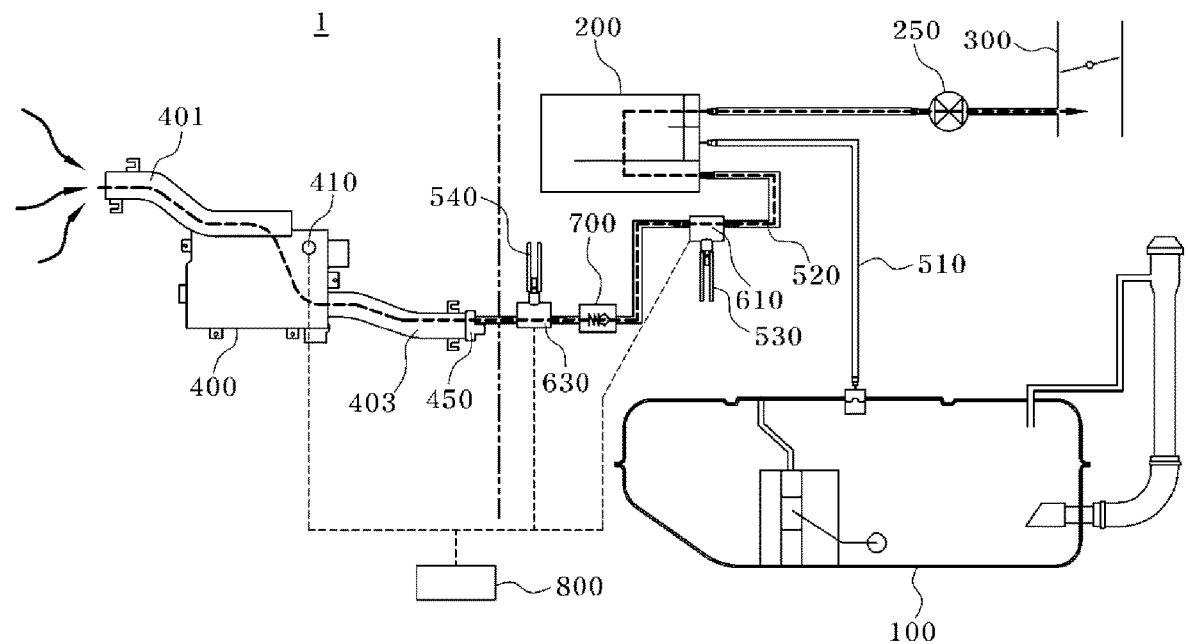

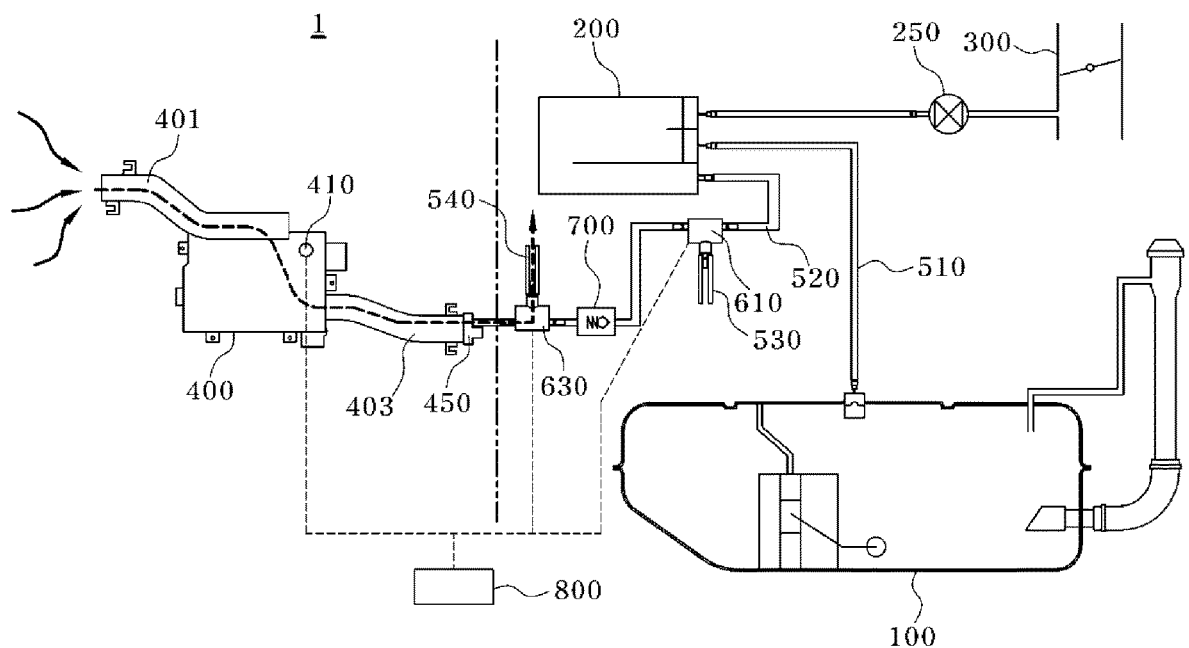
[FIG. 5]

[FIG. 6]
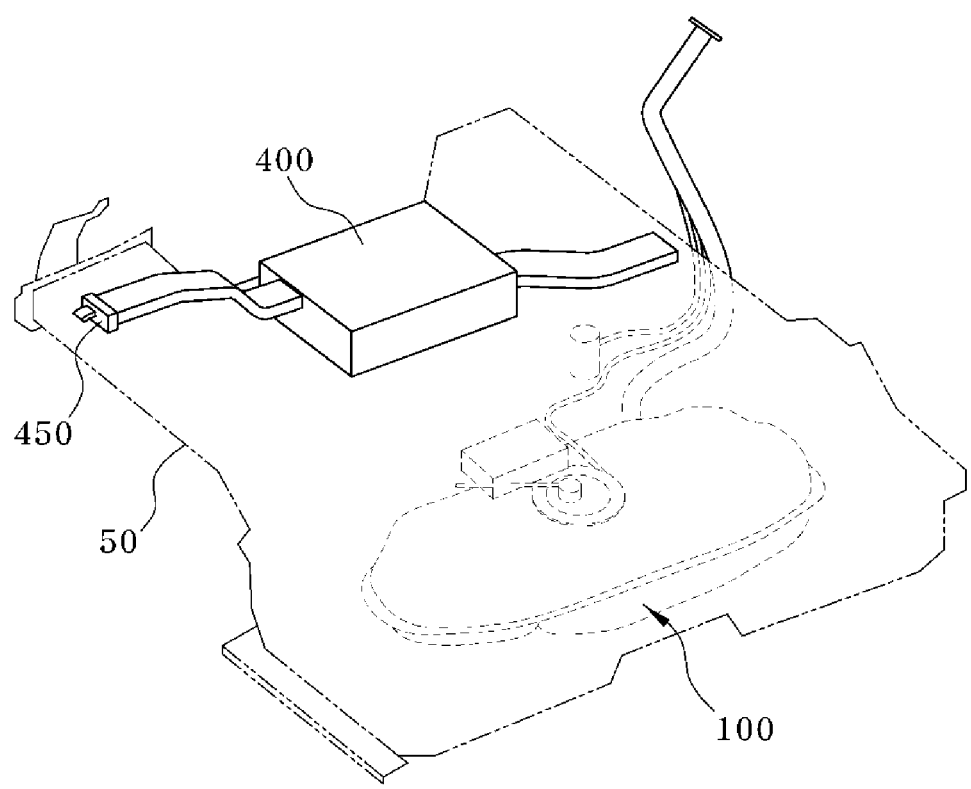

[FIG. 7]
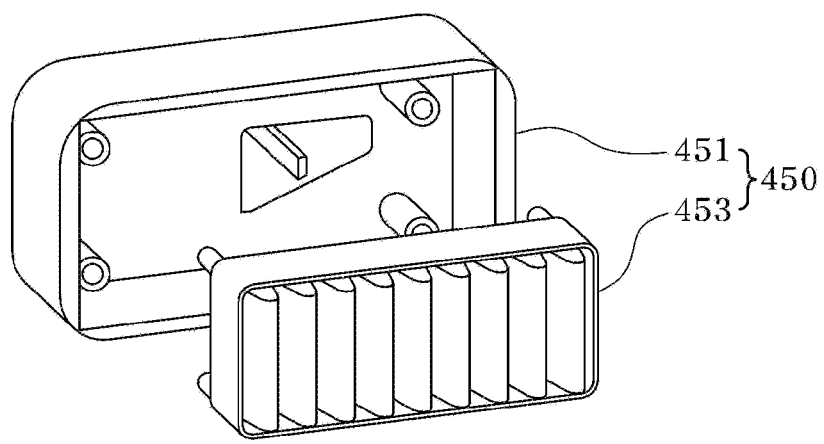

FUEL TANK VENTING SYSTEM FOR HYBRID VEHICLE

CROSS-REFERENCE TO RELATED APPLICATIONS

This application claims priority to Korean Patent Application No. 10-2019-0144339, filed on Nov. 12, 2019, which application is incorporated herein by reference.

TECHNICAL FIELD

The present disclosure relates to a fuel tank venting system for a hybrid vehicle.

BACKGROUND

In general, gasoline is filled into a fuel tank as fuel of a vehicle engine, and if the surrounding temperature is high or the vapor pressure of the fuel tank increases due to a reason such as the movement of steam, there is a risk in which the gasoline evaporated gas flows to the outside through the gap of the fuel tank. Since the gasoline evaporated gas is a carcinogen and harmful to the human body, each country has enacted environmental laws to regulate the outflow of the evaporated gas, and the actual vehicle applies a system that mounts a canister to capture the evaporated gas in order to prevent the discharge of the evaporated gas.

In the hybrid vehicle, a fuel tank and a high voltage battery are used simultaneously. At this time, the interior temperature is increased as the air that has cooled the high voltage battery is discharged into the vehicle. Further, there has also been a problem that the vehicle does not recycle the thermal energy of the air whose temperature is increased by discharging the air that has cooled the high voltage battery. Further, a hybrid vehicle to which the fuel tank and the high voltage battery are simultaneously applied should simultaneously process the air having cooled the high voltage battery and the gasoline evaporated gas, but there is no system capable of efficiently processing the air that has cooled the high voltage battery and the gasoline evaporated gas, such that there has been a problem that lowers the efficiency of cooling the high voltage battery and purging the canister.

The above information disclosed in this Background section is only for enhancement of understanding of the background of the disclosure and accordingly it may contain information that does not form the prior art that is already known to a person of ordinary skill in the art.

SUMMARY

The present disclosure relates to a fuel tank venting system for a hybrid vehicle. Particular embodiments relate to a fuel tank venting system that dualizes the air venting structure according to the pressure condition in a fuel tank.

An embodiment of the present disclosure provides a fuel tank venting system for a hybrid vehicle that dualizes the air venting structure for releasing the pressure of a fuel tank according to the pressure condition in the fuel tank.

Another embodiment of the present disclosure provides a fuel tank venting system for a hybrid vehicle that may increase the cooling efficiency of a high voltage battery when the vehicle is driven in the electric vehicle (EV) mode while releasing the pressure in a fuel tank.

Still another embodiment of the present disclosure provides a fuel tank venting system for a hybrid vehicle that may increase the life of an air filter for filtering foreign substances in the air and allow for easy replacement of the air filter.

Provided is a fuel tank venting system for a hybrid vehicle according to embodiments of the present disclosure. A fuel tank venting system for a hybrid vehicle may include a first flow path for delivering the fuel vaporized from a fuel tank to a canister, a second flow path for delivering the air used for cooling a high voltage battery to the canister, a first three-way valve disposed on the second flow path to control the opening and closing of a first discharge port for releasing the pressure of the fuel tank, a second three-way valve disposed on the second flow path to control the opening and closing of a second discharge port for flowing the air having cooled the high voltage battery into the canister or discharging the air having cooled the high voltage battery to the outside, and a controller for controlling the first three-way valve and the second three-way valve based on the pressure in the fuel tank and on whether the vehicle is driven in an EV mode.

According to an embodiment, when the pressure of the fuel tank is in a positive pressure state, the controller controls the first three-way valve to discharge the air in the fuel tank to the outside through the first discharge port.

According to an embodiment, the air in the fuel tank is delivered to the canister through the first flow path, and the air delivered to the canister is discharged to the outside through the second flow path and the first discharge port.

According to an embodiment, when the pressure of the fuel tank is in a negative pressure state, the controller controls the first three-way valve and the second three-way valve to move the air that has cooled the high voltage battery to the canister, thereby increasing the purge efficiency of the canister.

According to an embodiment, the first discharge port and the second discharge port are closed by a control of the first three-way valve and the second three-way valve.

According to an embodiment, when the vehicle is driven in the EV mode, the controller controls the first three-way valve to discharge the air that has cooled the high voltage battery to the outside through the second discharge port.

According to an embodiment, the controller determines whether the vehicle is driven in the EV mode based on the state of charge (SOC) of the high voltage battery.

According to an embodiment, the controller increases the driving amount of a blower motor disposed in the high voltage battery to increase the amount of the air flowing into the high voltage battery.

According to an embodiment, an air discharge port for discharging the air that has cooled the high voltage battery is provided to the high voltage battery, and an air filter is provided at the end of the air discharge port.

According to an embodiment, the air filter is provided between the air discharge port and the second flow path, and the air filter includes a cover coupled with the air discharge port and a filter paper detachably attached in the cover.

According to an embodiment, a check valve is provided between the first three-way valve and the second three-way valve, and the check valve flows the air that has cooled the high voltage battery only toward the canister.

According to an embodiment, the first three-way valve is disposed adjacent to the canister, and the second three-way valve is disposed adjacent to the high voltage battery.

According to an embodiment of the present disclosure, the fuel tank venting system for the hybrid vehicle may release the pressure of the fuel tank when the pressure of the fuel tank is in a positive pressure state, and enhance the purge performance of the canister by using the thermal energy of the air that has cooled the high voltage battery when the pressure of the fuel tank is in a negative pressure state. Further, when the vehicle is driven in the EV mode, the fuel tank venting system for the hybrid vehicle may increase the amount of the air driven by the high voltage battery, thereby efficiently cooling the high voltage battery. That is, the fuel tank venting system for the hybrid vehicle may simultaneously implement the adjustment of the pressure of the fuel tank, the enhancement of the performance of the canister, and the efficient cooling of the high voltage battery.

According to an embodiment of the present disclosure, the air filter may be disposed at the interior side of the vehicle, and may replace only the filter paper among the components of the air filter. Therefore, the user may replace only the filter paper of the air filter even without lifting the vehicle, if the life of the air filter is over. Further, since the air filter according to an embodiment of the present disclosure filters the interior air inside the vehicle, the life may be further extended relatively compared to filtering the air outside the vehicle.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed herein.

BRIEF DESCRIPTION OF THE DRAWINGS

The above and other features of the present disclosure will now be described in detail with reference to certain exemplary embodiments thereof illustrated in the accompanying drawings which are given by way of illustration only, and thus are not limitative of the present disclosure, and wherein:

FIG. 1 is a diagram illustrating a fuel tank venting system for a hybrid vehicle according to an embodiment of the present disclosure.

FIG. 2 is a block diagram for explaining a controller according to an embodiment of the present disclosure.

FIG. 3 is a diagram illustrating an embodiment of the fuel tank venting system for the hybrid vehicle when the pressure of a fuel tank satisfies a positive pressure condition.

FIG. 4 is a diagram illustrating an embodiment of the fuel tank venting system for the hybrid vehicle when the pressure of the fuel tank satisfies a negative pressure condition.

FIG. 5 is a diagram illustrating an embodiment of the fuel tank venting system for the hybrid vehicle when the vehicle is driven in the EV mode.

FIG. 6 is a diagram illustrating an arrangement relationship between the fuel tank and a high voltage battery according to an embodiment of the present disclosure.

FIG. 7 is a diagram illustrating an air filter according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, the same reference numbers refer to the same or equivalent parts of embodiments of the present disclosure throughout the several figures of the drawing.

DETAILED DESCRIPTION OF ILLUSTRATIVE EMBODIMENTS

Advantages and features of the present disclosure, and a method for achieving them, will become apparent with reference to the embodiments described in detail below together with the accompanying drawings. The present disclosure can, however, be embodied in many different forms and should not be construed as being limited to the embodiments set forth herein, and rather, these embodiments are provided so that this disclosure will be thorough and complete, and will fully convey the scope of the disclosure to those skilled in the art to which the present disclosure pertains, and the present disclosure is only defined by the scope of the claims. The same reference numerals refer to the same elements throughout the specification.

The terms "part," "unit," "module," etc. described in the specification mean a unit for processing at least one function or operation, and this may be implemented by hardware or software, or a combination of hardware and software.

Further, in the present specification, classifying the names of components into the first, second, etc. is for distinguishing the names of the components from each other in the same relation, and is not necessarily limited to its order in the following description.

The detailed description is illustrative of embodiments of the present disclosure. Further, the foregoing is intended to illustrate and explain the preferred embodiments of the present disclosure, and the present disclosure may be used in various other combinations, modifications, and environments. That is, it is possible to change or modify within the scope of the concept of the disclosure described in the present specification, the scope equivalent to the disclosure, and/or the scope of the skill and knowledge of the art. The described embodiments are intended to illustrate the best mode for implementing the technical spirit of the present disclosure, and various changes may also be made in the specific applications and uses of the present disclosure. Therefore, the detailed description of embodiments of the above-described disclosure is not intended to limit the present disclosure to the disclosed embodiments. Further, it should be construed that the appended claims are also intended to cover such other embodiments.

FIG. 1 is a diagram illustrating a fuel tank venting system for a hybrid vehicle according to an embodiment of the present disclosure.

Referring to FIG. 1, a fuel tank venting system 1 for a hybrid vehicle may be implemented by a fuel tank 100, a canister 200, a high voltage battery 400, and a controller 800. The fuel tank venting system 1 for the hybrid vehicle may prevent the discharge of the evaporated gas evaporated from the fuel tank 100, and at the same time, may control the paths of the air and the evaporated gas through the controller 800 in order to recycle the thermal energy of the air that has cooled the high voltage battery 400.

The fuel tank 100 and the canister 200 may be connected by a first flow path 510. The fuel evaporated from the fuel tank 100 (evaporated gas) may be delivered to the canister 200. The canister 200 may be operated to capture the gaseous fuel in the activated carbon mounted therein (adsorption) in a state where an engine 300 has been stopped, and inject new air from outside of the canister 200 at the operation of the engine 300 to purge (desorption) the fuel adsorbed to the activated carbon to an intake system of the engine 300. That is, the canister 200 may operate to repeatedly perform the adsorption and the purge. The adsorption in the canister 200 is a state where a hydrocarbon gas is captured while being liquefied into activated carbon, and heat generation occurs as the phase changes from a gas to a liquid. As the temperature is higher, the speed and the adsorption rate at which liquefaction occurs lower, such that it is necessary to suppress a rise in the temperature inside the canister 200 in order to improve the adsorption rate of the fuel gas. The purge of the canister 200 is a state where the hydrocarbon captured in the activated carbon is discharged to the intake system of the engine while being vaporized in a fine liquid state, and endothermic reaction occurs during the liquefaction. Therefore, as the temperature is lower, the speed of vaporization and the purge efficiency lower, such that it has been necessary to suppress a drop in the temperature inside the canister 200 in order to improve the purge performance. In conclusion, thermal energy may be required to transfer the fuel captured in the activated carbon of the canister 200 to the engine 300.

A purge control valve 250 for purging fuel may be provided on the flow path connecting the canister 200 with the intake system side of the engine 300.

The canister 200 and the high voltage battery 400 may be connected by a second flow path 520. The second flow path 520 may deliver the air used for cooling the high voltage battery 400 to the canister 200.

The high voltage battery 400 may be a configuration of supplying electric energy for driving an electric motor (not illustrated). That is, the high voltage battery 400 may be a configuration that is mounted to a vehicle for driving the vehicle by the electric motor (not illustrated). The high voltage battery 400 may include an air inlet 401 for flowing outside air into the high voltage battery 400 for the cooling, and an air discharge port 403 for discharging the air that has cooled the high voltage battery 400. At this time, the outside air may mean the air introduced from the outside based on the high voltage battery 400, and may mean the air flowing into the high voltage battery 400 from the interior of the vehicle. Further, the high voltage battery 400 may be provided with a blower motor 410 for flowing air into the high voltage battery 400.

An air filter 450 may be disposed at the end of the air discharge port 403 of the high voltage battery 400. The air filter 450 may filter foreign substances of the air that cooled the high voltage battery 400. The air filter 450 is a configuration that is detachably attached to the high voltage battery 400, and may be modularized together with the high voltage battery 400.

A first three-way valve 610 and a second three-way valve 630 may be provided on the second flow path 520. The first three-way valve 610 and the second three-way valve 630 may mean a 3-way valve. For example, the first three-way valve 610 and the second three-way valve 630 may be a solenoid valve. The first three-way valve 610 may be disposed to be adjacent to the canister 200, and the second three-way valve 630 may be disposed to be adjacent to the high voltage battery 400. The first three-way valve 610 may control the opening and closing of a first discharge port 530 that is a passage for releasing the pressure of the fuel tank 100 when the pressure in the fuel tank wo is in a positive pressure state. The air in the fuel tank 100 may be discharged to the outside of the vehicle through the first discharge port 530. That is, the first three-way valve 610 may be disposed at the point where the second flow path 520 and the first discharge port 530 meet.

The second three-way valve 630 may flow the air that cooled the high voltage battery 400 to the canister 200 when the pressure in the fuel tank 100 is in a negative pressure state. Further, the second three-way valve 630 may control the opening and closing of a second discharge port 540 for discharging the air that cooled the high voltage battery 400 to the outside when the vehicle is operated in the EV mode. That is, the second three-way valve 630 may be disposed at the point where the second flow path 520 and the second discharge port 540 meet. The first discharge port 530 and the second discharge port 540 may be passages for discharging air to the outside of the vehicle.

A check valve 700 may be provided between the first three-way valve 610 and the second three-way valve 630. The check valve 700 may flow the air that cooled the high voltage battery 400 only toward the canister 200. That is, the check valve 700 may serve to prevent the air or the vaporized fuel from flowing from the canister 200 into the high voltage battery 400. If the opening and closing of the first three-way valve 610 and the second three-way valve 630 are controlled, the air or the vaporized fuel may not flow from the canister 200 into the high voltage battery 400, but if either the first three-way valve 610 or the second three-way valve 630 fails, the air or the vaporized fuel may flow from the canister 200 to the high voltage battery 400. Therefore, the check valve 700 may prevent the air or the vaporized fuel from flowing from the canister 200 into the high voltage battery 400 in preparation for the case where at least one valve of the first three-way valve 610 and the second three-way valve 630 has failed. Furthermore, the check valve 700 may prevent the vaporized fuel from flowing into the vehicle through the high voltage battery 400.

The controller 800 may control the opening and closing of the first three-way valve 610 and the second three-way valve 630 based on the pressure in the fuel tank 100 and on whether the vehicle is driven in the EV mode. For example, the controller 800 may be an electronic control unit (ECU).

For example, the controller 800 may determine whether to perform a control of flowing the vaporized fuel in the fuel tank 100 to the canister 200 or a control of flowing the air that has cooled the high voltage battery 400 to the canister 200 according to whether the pressure in the fuel tank 100 is in a positive pressure state or a negative pressure state. If the controller 800 performs the control of flowing the vaporized fuel in the fuel tank 100 to the canister 200, the fact that the pressure in the fuel tank 100 maintains the positive pressure may be released, thereby smoothly supplying the fuel. If the controller 800 performs the control of flowing the air that cooled the high voltage battery 400 to the canister 200, the air whose temperature has risen through the heat exchange in the high voltage battery 400 may flow to the canister 200, and the high temperature air may induce the endothermic reaction of the activated carbon in the canister 200. The fuel captured according to the endothermic reaction of the activated carbon may be transferred to the engine 300. That is, the air whose temperature has risen through the heat exchange in the high voltage battery 400 may flow into the canister 200, thereby enhancing the purge performance (or purge efficiency) of the canister 200. Therefore, the thermal energy of the air that cooled the high voltage battery 400 may be recycled.

For example, the controller 800 may increase the driving amount of the blower motor 410 positioned in the high voltage battery 400 when the vehicle is driven in the EV mode. Therefore, the amount of the air flowing into the air inlet 401 of the high voltage battery 400 may be increased, and the high voltage battery 400 may be efficiently cooled. Further, since the controller 800 controls the second three-way valve 630 to discharge the air that cooled the high voltage battery 400 through the second discharge port 540, the air whose temperature has risen may be discharged outside the vehicle, thereby not causing the phenomenon of raising the temperature in the vehicle.

According to an embodiment of the present disclosure, the fuel tank venting system 1 for the hybrid vehicle may release the pressure of the fuel tank 100 when the pressure of the fuel tank 100 is in a positive pressure state, and may enhance the purge performance of the canister 200 by using the thermal energy of the air that cooled the high voltage battery 400 when the pressure of the fuel tank 100 is in a negative pressure state. Further, when the vehicle is driven in the EV mode, the fuel tank venting system 1 for the hybrid vehicle may increase the amount of the air driven by the high voltage battery 400 to efficiently cool the high voltage battery 400. In conclusion, the fuel tank venting system 1 for the hybrid vehicle may simultaneously implement the pressure adjustment of the fuel tank 100, the performance enhancement of the canister 200, and the efficient cooling of the high voltage battery 400.

FIG. 2 is a block diagram for explaining a function of a controller according to an embodiment of the present disclosure.

Referring to FIGS. 1 and 2, a pressure sensor 150 may measure the pressure of the fuel tank 100. The pressure sensor 150 may measure whether the pressure in the fuel tank 100 is in a positive pressure state or a negative pressure state. Data measured by the pressure sensor 150 may be transmitted to the controller 800.

The controller 800 may continuously monitor the state of charge (SOC) of the high voltage battery 400. The controller 800 may determine whether the vehicle is driven in the EV mode or is driven by the engine 300 based on the SOC of the high voltage battery 400. For example, the controller 800 may determine that the vehicle is being driven in the EV mode when the SOC of the high voltage battery 400 is a predetermined value or more. However, unlike the above-described example, the controller 800 may directly determine whether the engine 300 is being driven to also determine whether the vehicle is being driven in the EV mode. For example, the controller 800 may determine whether the vehicle is being driven in the EV mode based on whether the engine 300 is ignited, the sensing data of a camshaft sensor (not illustrated) of the engine, or the like.

The controller 800 may control the first three-way valve 610, the second three-way valve 630, and the blower motor 410 based on the data received from the pressure sensor 150 and the data having monitored the high voltage battery 400. The controller 800 may determine a case where the pressure in the fuel tank 100 is in a positive pressure state, a case where the pressure in the fuel tank 100 is in a negative pressure state, and a case where the vehicle is being driven in the EV mode, and based on the above, may control the opening and closing of the first three-way valve 610 and the second three-way valve 630 and control the driving degree of the blower motor 410.

FIG. 3 is a diagram illustrating an embodiment of a fuel tank venting system for a hybrid vehicle when the pressure of the fuel tank satisfies a positive pressure condition.

Referring to FIG. 3, when the pressure in the fuel tank 100 satisfies the positive pressure condition, the controller 800 may turn off the first three-way valve 610. Turning off the first three-way valve 610 may mean opening the first discharge port 530. Therefore, the controller 800 may control the first three-way valve 610 to discharge the air in the fuel tank 100, in the first flow path 510, and in the second flow path 520 through the first discharge port 530. As the air in the fuel tank 100, in the first flow path 510, and in the second flow path 520 are discharged, the pressure in the fuel tank 100 may vary.

When the pressure in the fuel tank 100 satisfies the positive pressure condition, there occurs a problem in that the vaporized fuel in the fuel tank 100 does not flow to the canister 200. Therefore, the amount of the fuel transferred from the canister 200 to the engine 300 may also be reduced, thereby reducing the efficiency of the engine 300. Therefore, as the controller 800 opens the first discharge port 530 to discharge the air in the fuel tank 100, in the first flow path 510, and in the second flow path 520 to the outside of the vehicle, the pressure in the fuel tank 100 may be adjusted.

FIG. 4 is a diagram illustrating an embodiment of the fuel tank venting system for the hybrid vehicle when the pressure of the fuel tank satisfies the negative pressure condition.

Referring to FIG. 4, when the pressure in the fuel tank 100 satisfies the negative pressure condition, the controller 800 may turn on the first three-way valve 610 and turn off the second three-way valve 630. Turning on the first three-way valve 610 may mean closing the first discharge port 530. Turning off the second three-way valve 630 may mean closing the second discharge port 540. At this time, since the pressure in the fuel tank 100 is in a negative pressure state and the fuel is transferred from the canister 200 toward the intake side of the engine 300, the amount of the air flowing into the high voltage battery 400 may be increased by the pressure difference. Therefore, even if there is no suction pump for flowing air into the high voltage battery 400 separately by the above control, the amount of the air flowing into the high voltage battery 400 may be increased, and the cooling efficiency of the high voltage battery 400 may be increased.

When the pressure in the fuel tank 100 satisfies the negative pressure condition, the air that cooled the high voltage battery 400 may flow to the canister 200. At this time, the air may not be discharged to the outside of the vehicle through the first discharge port 530 and the second discharge port 540. The negative pressure of the fuel tank 100 may be released by the flow of the air. The air that has undergone the heat exchange in the cooling process of the high voltage battery 400 may rise in temperature. The air whose temperature has risen may flow to the canister 200 to promote desorption reaction in the canister 200. Therefore, it is possible to enhance the efficiency of the purge phenomenon in which fuel moves from the canister 200 to the intake side of the engine 300.

According to an embodiment of the present disclosure, the fuel tank venting system 1 for the hybrid vehicle may have a path for releasing the positive pressure in the fuel tank 100 and a path for releasing the negative pressure in the fuel tank 100 different from each other.

FIG. 5 is a diagram illustrating an embodiment of the fuel tank venting system for the hybrid vehicle when the vehicle is driven in the EV mode.

Referring to FIG. 5, if the vehicle is being driven in the EV mode, the controller 800 may turn on the second three-way valve 630. Turning on the second three-way valve 630 may mean opening the second discharge port 540. Further, the controller 800 may increase the driving amount of the blower motor 410 disposed in the high voltage battery 400. Therefore, the amount of the air introduced through the air inlet 401 of the high voltage battery 400 may be increased. The air that cooled the high voltage battery 400 may be discharged to the outside of the vehicle through the second discharge port 540. The air whose temperature has risen does not flow into the vehicle, thereby preventing the phenomenon in which the temperature in the vehicle rises. Further, as the driving amount of the blower motor 410 is increased, the cooling efficiency of the high voltage battery 400 may be increased.

FIG. 6 is a diagram illustrating an arrangement relationship between the fuel tank and the high voltage battery according to an embodiment of the present disclosure.

Referring to FIG. 6, the high voltage battery 400 may be disposed above a floor panel 50 that is on the interior side of the vehicle body, and the fuel tank 100 may be disposed below the floor panel 50. That is, the high voltage battery 400 may be disposed adjacent to the interior of the vehicle with respect to the floor panel 50, and the fuel tank 100 may be disposed adjacent to the bottom surface of the vehicle or the ground with respect to the floor panel 50. Therefore, the air inlet 401 of the high voltage battery 400 may introduce the interior air of the vehicle.

The air filter 450 may be disposed at the end of the air discharge port 403. The air filter 450 may filter foreign substances of the air discharged through the air discharge port 403. Since the air filter 450 is disposed above the floor panel 50, the user may replace the air filter 450 even without lifting the vehicle. Further, as the high voltage battery 400 is disposed at the interior side of the vehicle with respect to the floor panel 50, the air flowing into the high voltage battery 400 may be the air in the interior of the vehicle. Therefore, the air filter 450 may filter the air in the interior of the vehicle in which less foreign substances are contained relative to the air outside the vehicle, thereby increasing the life of the air filter 450.

FIG. 7 is a diagram illustrating an air filter according to an embodiment of the present disclosure.

Referring to FIGS. 6 and 7, the air filter 450 may include a cover 451 and a filter paper 453. The filter paper 453 may be a configuration that should be replaced periodically. Therefore, the operation of replacing the filter paper 453 may be easily performed only when the air filter 450 is easily attached or detached. According to an embodiment of the present disclosure, since the air filter 450 is a configuration that is disposed at the interior side of the vehicle, the filter paper 453 may be easily replaced.

The filter paper 453 may be a configuration that may be detachably attached to the cover 451. The cover 451 is a configuration that is coupled with the air discharge port 403, and may be a configuration that is detachably attached to the air discharge port 403. The user may easily replace the filter paper 453 by detaching the air filter 450 disposed at the interior side of the vehicle from the air discharge port 403, and then detaching the filter paper 453 from the cover 451.

According to an embodiment of the present disclosure, the air filter 450 may be disposed at the interior side of the vehicle, and only the filter paper 453 of the components of the air filter 450 may be replaced. Therefore, if the life of the air filter 450 is over, the user may replace only the filter paper 453 of the air filter 450 even without lifting the vehicle. Further, since the air filter 450 according to an embodiment of the present disclosure filters the interior air of the vehicle, the life of the air filter 450 may be further extended relative to the case of filtering the air outside the vehicle.

As described above, although the embodiments of the present disclosure have been described with reference to the accompanying drawings, it will be understood by those skilled in the art to which the present disclosure pertains that other specific forms may be embodied without changing the technical spirit or the essential features thereof. Therefore, it should be understood that the above-described embodiments are illustrative and are not restrictive in all respects.

What is claimed is:

1. A fuel tank venting system for a hybrid vehicle, the fuel tank venting system comprising:
   a first flow path configured to deliver fuel vaporized from a fuel tank to a canister;
   a second flow path configured to deliver air used for cooling a high voltage battery to the canister;
   a first three-way valve disposed on the second flow path and configured to control opening and closing of a first discharge port for releasing pressure of the fuel tank;
   a second three-way valve disposed on the second flow path and configured to control opening and closing of a second discharge port for flowing the air used for cooling the high voltage battery into the canister or discharging the air used for cooling the high voltage battery outside the vehicle; and
   a controller configured to control the first three-way valve and the second three-way valve based on the pressure in the fuel tank and on whether the vehicle is driven in an EV mode.

2. The fuel tank venting system of claim 1, wherein when the pressure of the fuel tank is in a positive pressure state, the controller is configured to control the first three-way valve to discharge the air in the fuel tank to the outside of the vehicle through the first discharge port.

3. The fuel tank venting system of claim 2, wherein the air in the fuel tank is delivered to the canister through the first flow path, and wherein the air delivered to the canister is discharged to the outside of the vehicle through the second flow path and the first discharge port.

4. The fuel tank venting system of claim 1, wherein when the pressure of the fuel tank is in a negative pressure state, the controller is configured to control the first three-way valve and the second three-way valve to move the air used for cooling the high voltage battery to the canister.

5. The fuel tank venting system of claim 4, wherein the first discharge port and the second discharge port are configured to be closed by a control of the first three-way valve and the second three-way valve.

6. The fuel tank venting system of claim 1, wherein when the vehicle is driven in the EV mode, the controller is configured to control the first three-way valve to discharge the air used for cooling the high voltage battery to the outside of the vehicle through the second discharge port.

7. The fuel tank venting system of claim 6, wherein the controller is configured to determine whether the vehicle is driven in the EV mode based on a state of charge (SOC) of the high voltage battery.

8. The fuel tank venting system of claim 6, further comprising a blower motor disposed in the high voltage battery, wherein the controller is configured to increase a driving amount of the blower motor to increase an amount of the air flowing into the high voltage battery.

9. The fuel tank venting system of claim 1, further comprising:
   an air discharge port configured to discharge the air used for cooling the high voltage battery; and
   an air filter provided at an end of the air discharge port.

10. The fuel tank venting system of claim 9, wherein the air filter is provided between the air discharge port and the second flow path, and wherein the air filter comprises:
a cover coupled with the air discharge port; and
a filter paper detachably attached in the cover.

11. The fuel tank venting system of claim 1, further comprising a check valve provided between the first three-way valve and the second three-way valve, wherein the check valve is configured to flow the air used for cooling the high voltage battery only toward the canister.

12. The fuel tank venting system of claim 11, wherein the first three-way valve is disposed adjacent to the canister, and wherein the second three-way valve is disposed adjacent to the high voltage battery.

13. A method of operating a fuel tank venting system of a vehicle, the method comprising:
delivering fuel vaporized from a fuel tank to a canister along a first flow path;
delivering air used for cooling a high voltage battery to the canister along a second flow path; and
controlling a first three-way valve and a second three-way valve based on a pressure in the fuel tank and on whether the vehicle is driven in an EV mode, wherein the first three-way valve is disposed on the second flow path and controls opening and closing of a first discharge port for releasing pressure of the fuel tank, and the second three-way valve is disposed on the second flow path and controls opening and closing of a second discharge port for flowing the air used for cooling the high voltage battery into the canister or discharging the air used for cooling the high voltage battery outside the vehicle.

14. The method of claim 13, further comprising, when the pressure of the fuel tank is in a positive pressure state, controlling the first three-way valve to discharge the air in the fuel tank to the outside of the vehicle through the first discharge port, wherein the air in the fuel tank is delivered to the canister through the first flow path, and wherein the air delivered to the canister is discharged to the outside of the vehicle through the second flow path and the first discharge port.

15. The method of claim 14, further comprising, when the pressure of the fuel tank is in a negative pressure state, controlling the first three-way valve and the second three-way valve to move the air used for cooling the high voltage battery to the canister, wherein the first discharge port and the second discharge port are closed by control of the first three-way valve and the second three-way valve.

16. The method of claim 13, further comprising, when the vehicle is driven in the EV mode, controlling the first three-way valve to discharge the air used for cooling the high voltage battery to the outside of the vehicle through the second discharge port.

17. The method of claim 16, further comprising determining whether the vehicle is driven in the EV mode based on a state of charge (SOC) of the high voltage battery.

18. The method of claim 16, further comprising increasing a driving amount of a blower motor disposed in the high voltage battery to increase an amount of the air flowing into the high voltage battery.

19. A vehicle comprising:
a vehicle body;
a floor panel disposed at a bottom of the vehicle body;
a high voltage battery disposed above the floor panel on an interior side of the vehicle body;
a fuel tank disposed below the floor panel on an exterior side of the vehicle body;
a canister connected to the fuel tank by a first flow path and connected to the high voltage battery by a second flow path;
a first three-way valve provided on the second flow path adjacent to the canister;
a second three-way valve provided on the second flow path adjacent to the high voltage battery; and
a controller configured to control the first three-way valve and the second three-way valve.

20. The vehicle of claim 19, wherein the first three-way valve is configured to control opening and closing of a first discharge port for releasing pressure of the fuel tank, and wherein the second three-way valve is configured to control opening and closing of a second discharge port for discharging air used for cooling the high voltage battery.

* * * * *